United States Patent [19]

Burn

[11] 4,087,725

[45] May 2, 1978

[54] COKE OVEN HOT CARS

[75] Inventor: Patrick Marion Burn, North Balwyn, Australia

[73] Assignee: The Broken Hill Proprietary Company Limited, Melbourne, Australia

[21] Appl. No.: 488,760

[22] Filed: Jul. 15, 1974

[30] Foreign Application Priority Data

Jul. 16, 1973 Australia ............................. 4094/73

[51] Int. Cl.² .............................................. H02P 7/68
[52] U.S. Cl. ....................................... 318/52; 105/4 R
[58] Field of Search ....................... 318/52, 561; 105/3, 105/4, 26, 34, 61, 136, 184, 254

[56] References Cited

U.S. PATENT DOCUMENTS

| | | | |
|---|---|---|---|
| 3,183,422 | 5/1965 | Stamm | 318/52 UX |
| 3,210,630 | 10/1965 | Zelina | 318/52 |
| 3,277,355 | 10/1966 | Troutman et al. | 318/561 |
| 3,296,510 | 1/1967 | Stamm | 318/52 |
| 3,321,684 | 5/1967 | Stamm | 318/52 UX |
| 3,661,097 | 5/1972 | Jackson | 105/136 X |
| 3,678,864 | 7/1972 | Gutridge | 105/4 |
| 3,719,868 | 3/1973 | McSparran | 318/52 |
| 3,828,236 | 8/1974 | Cluse | 318/561 |
| 3,870,604 | 3/1975 | Wilt, Jr. | 105/254 X |

*Primary Examiner*—Robert K. Schaefer
*Assistant Examiner*—W. E. Duncanson, Jr.
*Attorney, Agent, or Firm*—Cushman, Darby & Cushman

[57] ABSTRACT

This specification discloses a rail car for carrying hot coke from a coke oven to a quenching station in combination with a control system for automatically controlling the acceleration, deceleration, stopping and starting of the rail car to achieve optimum cycle times having regard to track conditions. The rail car includes a chassis supporting a load container and a plurality of wheeled bogies supporting the chassis and container, at least the forward bogie being directly driven by two electric traction motors and being located at the position of maximum weight of the rail car. The motors provide both acceleration and braking torques for the rail car and are controlled by the control system. The control system includes a slip detection circuit connected to a speed regulator for modifying the regulation applied by the speed regulator to remove wheel slip. The speed regulator is controlled via a ramp generator which dictates the acceleration and deceleration profiles for the motors. The control system also includes a closed loop position regulator for accurately positioning the rail car at a coke oven.

6 Claims, 4 Drawing Figures

COKE OVEN HOT CARS

This invention relates to improvements in coke ovens hot cars handling capacity of coke from the ovens through the quenching operation to the coke wharf or other receiving point. The invention also relates to a coke ovens hot car system.

The usual practice with coke ovens of the by-products type is to push the contents of each oven into a hot car which is driven at creep speed past the oven in an endeavour to obtain an even distribution of coke in the car. The hot car is drawn by a separate locomotive and both the locomotive and the hot car have mechanical braking mechanisms by means of which the positioning of the hot car at the several points of the system is in part controlled.

There has been a trend to fully automatic and driverless operation of the hot car-locomotive combination. However, it has been found that the braking mechanisms used to date are very difficult and costly to maintain to the precision required for automatic operation where large numbers of ovens are required to be serviced by the vehicle. These difficulties are magnified by the necessity to control braking via an indirect chain of electrical through pneumatic to mechanical processes.

Because the locomotive is at present a separate vehicle, traction is handicapped by the presence of a rolling load which does not contribute to rail adhesion, limiting the potential performance particularly on the often wet and contaminated tracks found in this application.

The above described limitations of prior art hOt cars cause inaccurate initial positioning of the hot car at an oven for all track conditions and inability to achieve a uniform creep past the oven, resulting in uneven distribution of coke in the car and slow cycle times. An uneven distribution of coke in the car causes uneven quenching and varying moisture contents in the resultant products. The object of the invention is to provide an improved hot car that does not suffer from these problems and that can be more readily controlled precisely to produce more uniform creep speeds and to yield shorter hot car cycle times leading to increased size of ovens installations serviceable by one hot car with higher car availability, lower costs and a more consistent quality coke. A related object is the provision of a system for controlling the hot car.

The invention provides a rail car for carrying hot coke from one point to another, comprising a chassis supporting a load container, a plurality of wheeled bogies having supporting frames which are pivotal about a central generally vertical axis with respect to the chassis, at least two electric traction motors supplying drive to at least the forward bogie, said forward bogie being located at the position of maximum weight of the rail car, and control means providing both forward and reverse torques through said motors.

The rail car according to the invention combines the locomotive and hot car to reduce the tractive effort problem and also employs direct motor braking to render performance independent of mechanical braking. This improves service availability and maintenance, and by allowing accurate and faster control of the homing and creep speeds of the car, the reduction of overall travel time is reduced and this increases the coke output available per car.

Mechanical braking is employed only for holding and emergency purposes. Traction benefits from a placement of as much of the total weight as desired directly on driven wheels.

The invention also provides a control system for a hot coke car comprising a speed regulator for the drive motors of the hot car, control means for said speed regulator to modify the regulation applied by said speed regulator to remove wheel slip, and a position regulator circuit connected to said speed regulator for locating the hot car accurately at a predetermined position.

Preferably the control system defined above is incorporated in the hot car previously defined to provide an improved hot car/control system, the advantages of which will become apparent below.

A preferred form of the invention will now be described with reference to the accompanying drawings in which.

Figure 1:
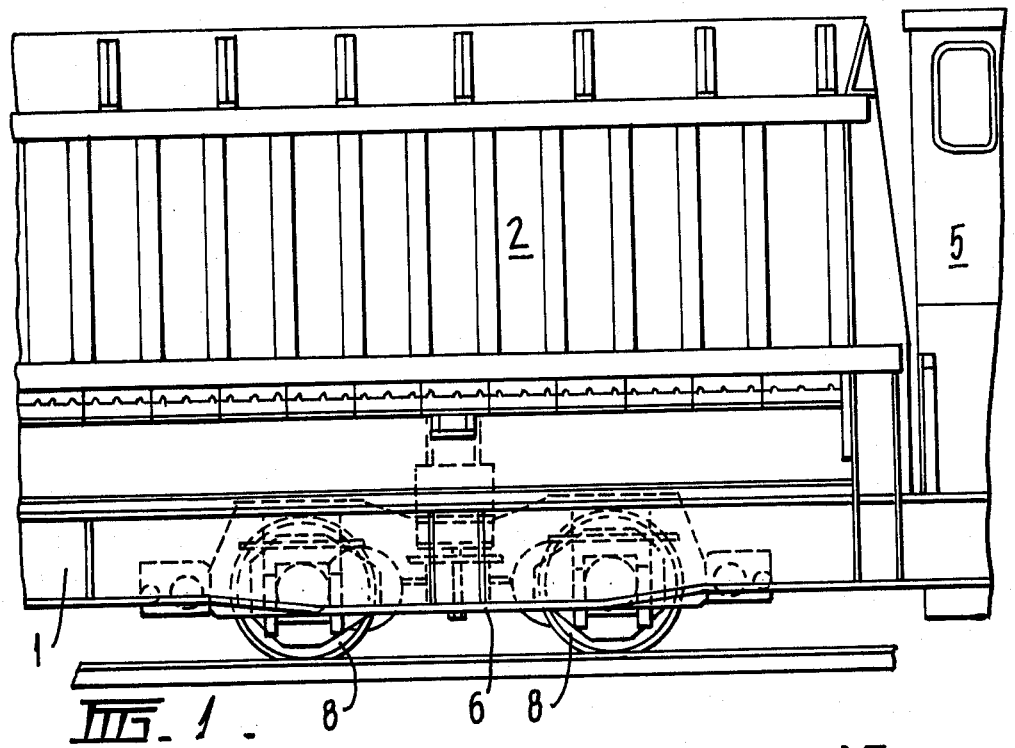
FIG. 1 is a fragmentary side elevation of a coke ovens hot car embodying the invention.
Figure 2:
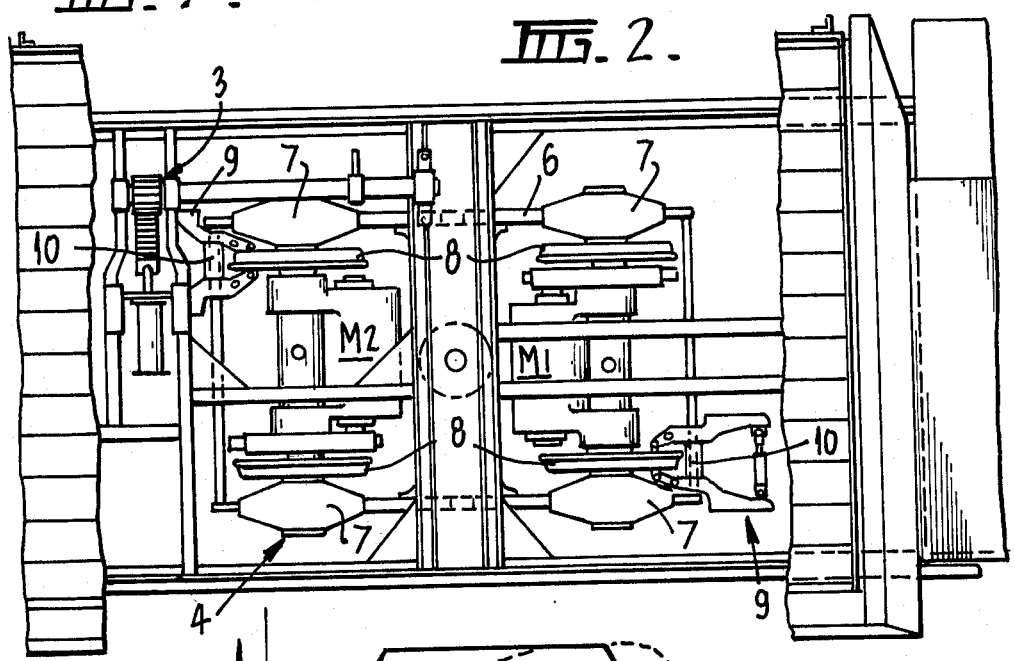
FIG. 2 is a fragmentary plan view of the hot car with the coke container broken away to expose the driven bogie.

Referring firstly to FIGS. 1 and 2, the coke ovens hot car will be seen to include a chassis 1 supporting a coke receiving container 2 which is tiltable by a mechanism 3 to discharge the coke from the container 2 at the end of a cycle. The chassis 1 is supported by two bogies 4, only one of which is shown. The other bogie is located near the rear of the chassis 1 while the bogie 4 is located as far rearwardly of the central cabin 5 of the hot car as possible to ensure that the maximum possible weight is transferred to this bogie. In the present embodiment, the effective weight on the bogie 4 with a container full of coke is 67 tonnes compared with 20 tonnes in the case of a prior art hot car having a separate locomotive, based on a total weight of each vehicle system of 100 tonnes.

The bogie 4 has a support frame 6 which is pivotally secured to the chassis 1 about a central generally vertical axis. The frame 6 has four enclosed bearing assemblies 7 which support the ends of the axles for wheels 8. The axles are driven by shunt direct current motors $M_1$ and $M_2$ which are totally enclosed against the water/steam environment experienced at the quenching station. Hydraulically operated caliper brakes 9 are arranged to bring braking pads into contact with machined faces on one wheel 8 of each set. These disc brakes are used for parking and emergency braking operations only since the main braking requirements of the hot car are met by regenerating the motors $M_1$ and $M_2$. Each brake 9 has a fail safe spring 10 which is released by an hydraulically activated mechanism (not shown).

Figure 3:
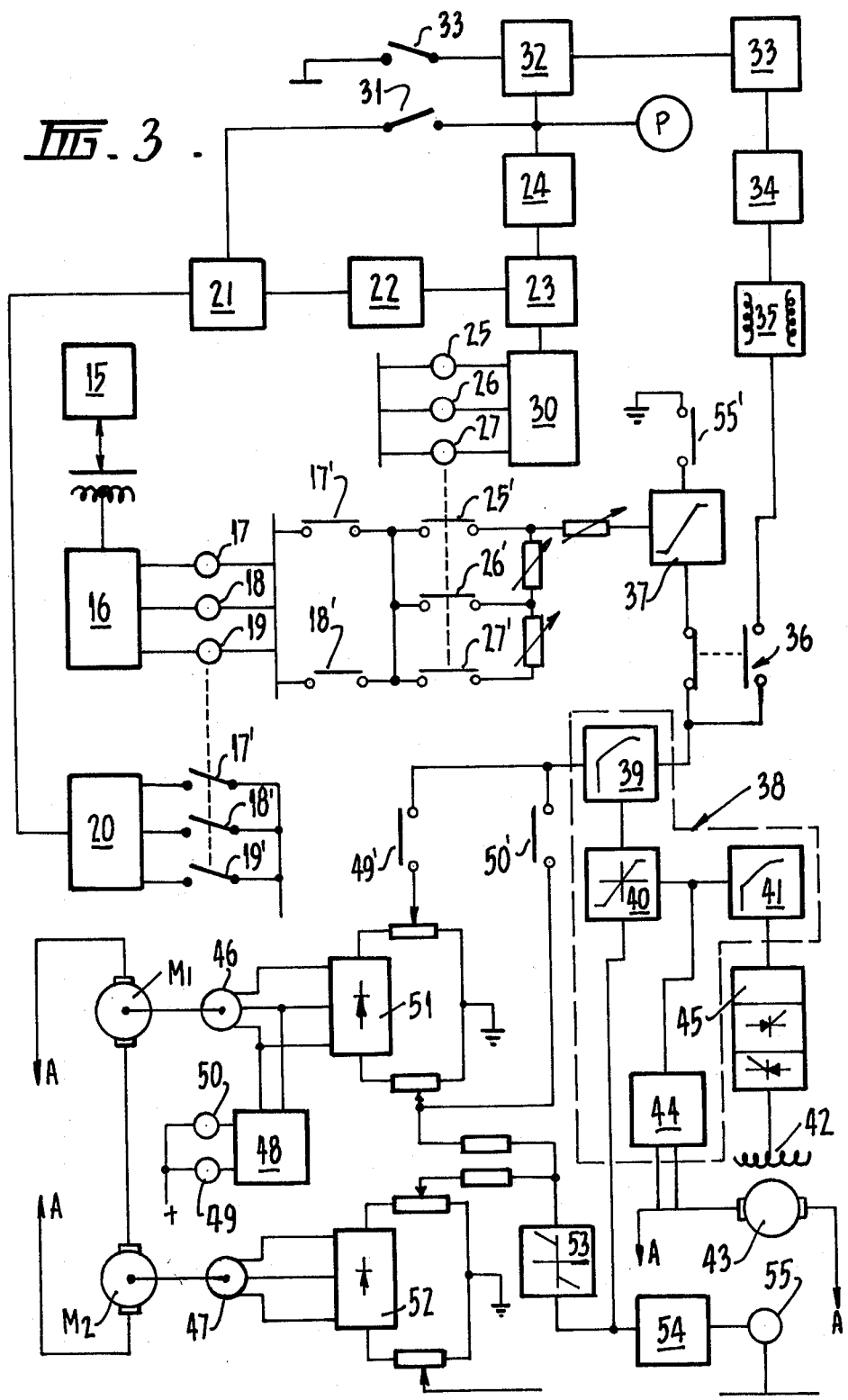
FIG. 3 is a block diagram of the control system for the hot car.

The driving motors $M_1$ and $M_2$ operate under the control of a closed loop control system represented in block diagram form in FIG. 3. In the present embodiment the components of the control system are housed in the control cabin although this is not necessary as the control system or any section thereof may be housed at a central control point and the control current fed via rails and associated collector equipment.

Referring now to FIG. 3 it will be noted that under automatic control the control system receives programmed instructions from an automation system 15 either hand wired or computer memory, at a central control point via a two-way radio link which also transmits information regarding the position of the hot car back to the automation 15. Coded command instructions regarding the acceleration, deceleration, speeds and direction of the hot car necessary to optimize duty cycle times are transmitted from the automation 15 to a receiver 16. The receiver 16 in turn energises relay coils of the forward and reverse relays 17 and 18 and the speed reference relays 19 to close reference switches indicated by the primed numerals 17', 18' and 19'. The coded command information is then passed via a logic interface 20 and a counter 21, which is set by the speed reference information so received, to a digital to analogue converter 22 which generates a desired speed signal based on the information from the automation 15. The analogue output of converter 22 is squared to ensure a linear profile at the desired speed signal. The desired speed signal is fed to a multiplication and comparison unit 23 which also receives actual hot car speed information via a speed determination module 24 connected to the output B of the pulse tachometer P driven by an idling wheel on the vehicle. The multiplication and comparison unit 23 functions to pass an analogue signal to maintain the programmed relays 25 (8 m.p.h.), 26 (3 m.p.h.) and 27 (creep 1 m.p.h.) via a speed reference memory 30.

As mentioned above, the accurate positioning of the hot car at the coke oven is critical and for this reason the control circuit includes a closed loop position regulator comprising a counter 32 activated by a switch 33 enabled by a stop signal from the automation 15. The counter 32 is connected to a digital to analogue converter 33, similar to 22, and an analogue multiplier 34 connected via a voltage isolator 35 to the speed regulator 39 via the stop relay 36.

On activation of the desired direction and speed reference relays 17 or 18 and 25 to 27 by the automation, the hot car is accelerated and decelerated on a predetermined profile set by a reference ramp generator 37 connected via suitable bias resistors to the speed reference relay switches 25' to 27'. The ramp generator 37 is connected via the stop relay 36 to a Ward Leonard control loop 38 comprising an outer speed regulator circuit 39, a current limit circuit 40 and an inner current regulator circuit 41, connected in a closed loop via a thyristor controlled anti-parallel bridge 45 to the field coils 42 of a direct current generator 43 supplying current to the motors $M_1$ and $M_2$ (references A—A). Speed and current reset signals are derived from 46 and 44 respectively.

The speed of each of motors $M_1$ and $M_2$ is monitored by multipole A.C. tachogenerators 46 and 47 respectively. The output from tachogenerator 46 is in turn monitored by a phase rotation detector 48 which detects the relative displacement between two phases of tachogenerator 46 to determine whether the hot car is travelling forward or in reverse. This logic activates either a forward direction relay 49 to close forward switch 49' if the car is travelling forward or a reverse relay 50 to close reverse switch 50' if the car is in reverse. This arrangement ensures that the correct feedback polarity from the output of rectifier bridge 51 connected to the output of tachogenerator 46 is switched to the speed regulator 39.

The output from tachogenerator 47 is also rectified by a similar rectifier bridge 52 and the positive side of this bridge 52 is connected along with the negative side of bridge 51 to the input of a slip detection circuit 53. This circuit basically comprises a speed error amplifier which compares the outputs from tachogenerators 46 and 47 and amplifies the difference signal after a bias or dead band, which prevents small speed differences from producing outputs, is overcome. The difference signal is applied to the current limit circuit 40 of the loop control 38 to reduce the acceleration or deceleration torque of the motors $M_1$ and $M_2$ until traction is regained.

The difference signal also serves to fire a Schmitt trigger 54 which in turn activates a relay 55 to close switch 55' to hold the ramp generator 37 at its existing position. This serves to prevent the ramp generator continuing to operate while the wheels are slipping and while correction is applied so that the predetermined acceleration or deceleration profile is maintained and correction is more quickly achieved.

It will be realized from the above that the hot car is accelerated in accordance with the predetermined optimum profile for the location in question set by the ramp generator 37 input to the control loop 38. When the programmed speed is reached it is maintained by the control loop 38 until the automation 15 instructs the hot car to slow down at a fixed distance from its destination. If the programmed speed is not reached before the slowdown instruction is received, then converter 22 produces the desired signal for slowdown by closing 31 via the creep speed command. The multiplication and comparison unit 23 compares the output of 22 with the actual speed 24. While the desired speed is greater than the real speed the motors accelerate on the profile. When the real speed just exceeds expected speed produced from 21 and 22 the motors are switched to creep speed and are decelerated on the profile until creep speed is reached. This is programmed to occur a short distance before the destination to ensure no overshoot. When creep speed is reached and a stop signal is received from the automation 15, counter 34 is activated to allow the position regulator to accurately locate the hot car at the desired stopping point. When the vehicle comes to rest the mechanical brakes are applied to hold the vehicle at rest.

Figure 4:
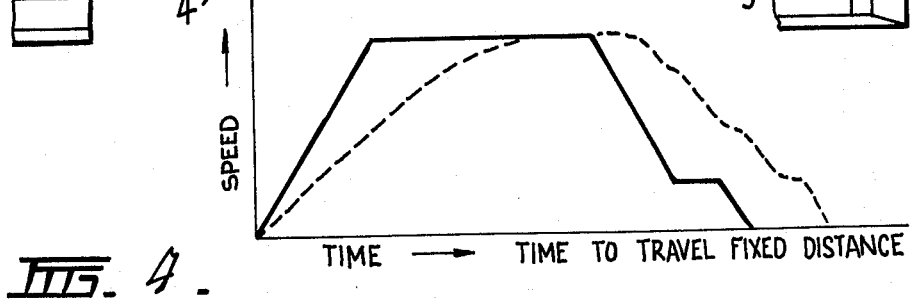
FIG. 4 shows graphs comparing the performance of the prior art hot car with that of the car embodying the invention.

Reference is directed to the comparative speed/distance graphs in FIG. 4 in which the performance of the hot car embodying the invention is represented by the full line while the prior art separate locomotive hot car having series d.c. motors and pneumatic braking is represented by the broken line. The full line represents the optimum profile for the hot car design described and it will be clear that the duty cycle is far shorter than that of the prior art hot car. In tests carried out on the described system, average cycle times for a typical large coke battery installation of 132 ovens, of 4 minutes 30 seconds can be achieved while the best time for a fully optimised automated or manually controlled system prior art hot car is about 5 minutes 30 seconds.

The described embodiment utilized DC generator driven shunt motors because the site for which the car was designed had a constant potential DC supply as the only power source available. On a green field site the generator would be replaced by a thyristor rectifier supplying the motors directly from a 415 volts 3 phase 50 HZ supply.

I claim:

1. In a coke quenching system: a pair of rails which are inherently liable to be wet and contaminated during operation of the system; a rail car for carrying hot coke from a coke oven to a quenching station including a chassis supporting a coke container, a plurality of wheeled axles, including a pair of forward axles, supporting said chassis and only said chassis at spaced-apart locations along the length of the chassis, said pair of forward axles being located under the forward end of the coke container so that the wheels of said forward axles have high tractive advantage when the container is loaded with coke; electric motors carried by the chassis drivingly connected to said forward axles; and a control system for said rail car including a speed regulator circuit for regulating both forward and reverse torques through said motors, and a slip detection circuit for generating a signal on any significant speed mismatch between said motors, said signal being applied to said speed regulator circuit to modify the regulation applied to remove wheel slip.

2. The coke quenching system of claim 1 wherein said speed regulator circuit comprises a control loop including an outer speed regulator circuit, a current limit circuit, and an inner current regulator circuit connected in a closed loop to the field coils of a d.c. generator supplying current to the motors, said amplifier output being connected to said current limit circuit.

3. The coke quenching system of claim 2, further comprising circuit means for determining an expected speed for the car from information received from a central control, circuit means for determining the actual speed of the car from a pulse generator connected to an idling wheel of the car, and circuit means for comparing said speeds and operative to cause the speed regulator to decelerate the car when there is a predetermined difference between the speeds.

4. The coke quenching system of claim 3 wherein said control system includes a position regulator circuit connected for locating the hot car accurately at a predetermined position, said position regulator circuit comprising a counter activated by a stop command, and circuitry receiving pulses representative of the position and speed of the car and said counter output, said circuitry receiving pulses representative of the car and said counter output, said circuitry operating to cause the speed regulator to decelerate the car to a stopped condition at the required position.

5. A coke quenching system as in claim 1 wherein said pair of forward axles is supported by a bogie having a frame which is pivoted for movement about a vertical axis.

6. A coke quenching system as in claim 1 wherein there are two electric motors, one driving each of the axles of said pair of forward axles.

* * * * *